May 29, 1951 — D. A. JOHNSON — 2,554,573
CLUTCH AND BRAKE MECHANISM
Filed Nov. 5, 1947 — 3 Sheets-Sheet 1

Inventor
DAVID A. JOHNSON

Inventor
DAVID A. JOHNSON

May 29, 1951   D. A. JOHNSON   2,554,573
CLUTCH AND BRAKE MECHANISM
Filed Nov. 5, 1947   3 Sheets-Sheet 3
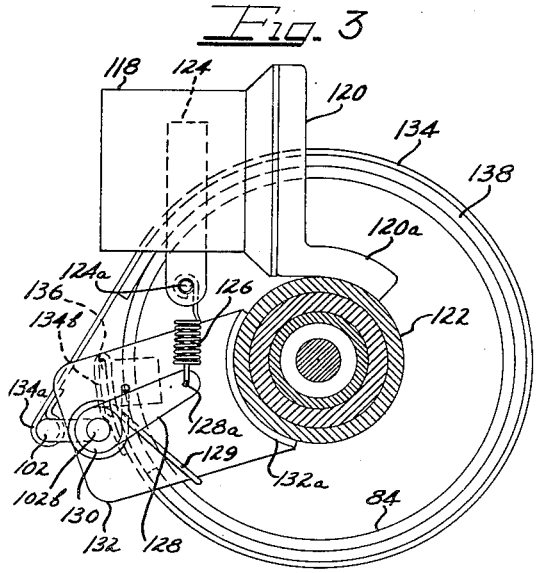
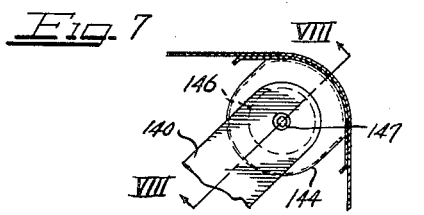
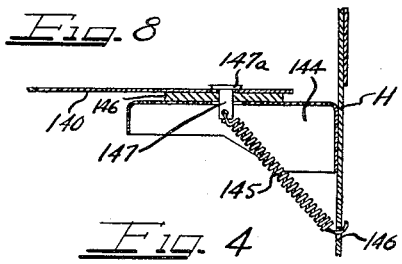
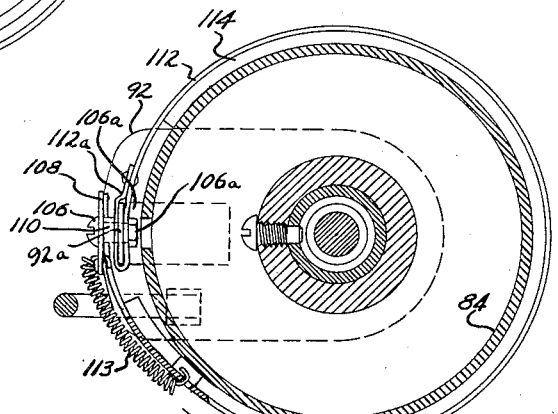
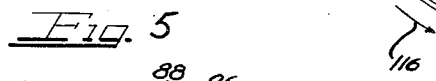
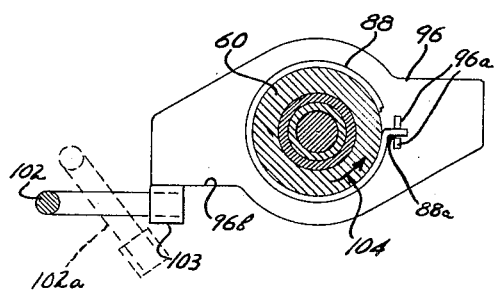
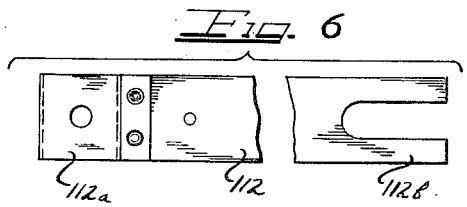
Inventor
DAVID A. JOHNSON
by [signature] Attys.

Patented May 29, 1951

2,554,573

UNITED STATES PATENT OFFICE 2,554,573

CLUTCH AND BRAKE MECHANISM

David A. Johnson, St. Joseph, Mich., assignor to Nineteen Hundred Corporation, St. Joseph, Mich., a corporation of New York Application November 5, 1947, Serial No. 784,109

12 Claims. (Cl. 192—17)

My invention relates to a selectively engageable clutch and brake mechanism.

In one type of automatic laundering machine a clothes tub is mounted on a hollow shaft and an agitator supported within the tub from a shaft coaxially mounted relative to the first shaft. When it is desired to wash or rinse clothing contained in the tub, the inner shaft is rotated while the outer shaft is held stationary. In one type of machine, for example, rotations of the inner shaft relative to the outer shaft cause wobbling movements of the agitator. When it is desired to dry clothing contained in the tub, both shafts are rotated to rotate the clothing and create centrifugal forces to drive the water out of the clothing.

In the foregoing type of laundering machines, a drive mechanism selectively operable to drive either the inner shaft or both shafts is required. Moreover, it is desirable that the driving engagement with the inner shaft be through a friction clutch capable of slipping to the end that overload of the drive mechanism is avoided if the tub contains water or is otherwise overloaded at the time the outer shaft is driven. Furthermore, the drive mechanism should brake the tub when the inner shaft is rotating to avoid movements of the tub in sympathy with the movements imparted to the agitator.

It is accordingly a general object of the present invention to provide an improved drive mechanism for a laundering machine.

A further object of the present invention is to provide an improved clutch and brake mechanism operable selectively to drive or brake a pair of concentric shafts.

Another object of the present invention is to provide an improved drive mechanism particularly adapted to drive a laundering machine of the type having a clothes tub and a wobble plate agitator mounted therein.

Further it is an object of the present invention to provide an improved laundering machine having a drive mechanism selectively operable to cause clothes washing or rinsing movement in one condition and to cause clothes drying movements in another condition.

Yet another object of the present invention is to provide an improved drive mechanism for a laundering machine and in which vibrations imparted to the shafts supporting the tub and agitator are isolated from the source of driving power.

Still another object of the present invention is to provide an improved drive mechanism having features of construction, combination and arrangement rendering it simple and inexpensive in construction and reliable in operation to the end that a unit of maximum utility is provided.

The novel features which I believe to be characteristic of my invention are set forth with particularity in the appended claims. My invention, itself, however, both as to organization and method of operation will best be understood by reference to the following description taken in connection with the accompanying drawings in which, Figure 1 is an axial cross sectional view of a laundering machine constructed in accordance with the principles of the present invention, and showing portions of the mechanism in side elevation;

Figures 3, 4 and 5 are cross sectional views through the axes III—III, IV—IV and V—V, Figure 2, respectively;

Figure 6 is a plan view of the clutch band used in the present invention;

Figure 7 is an enlarged fragmentary cross sectional view through axis VII—VII, Figure 1 and showing the snubbing arm support structure in top plan view; and Figure 8 is a side elevational view of the snubber arm support structure.

As shown on the drawing:

Figure 1:
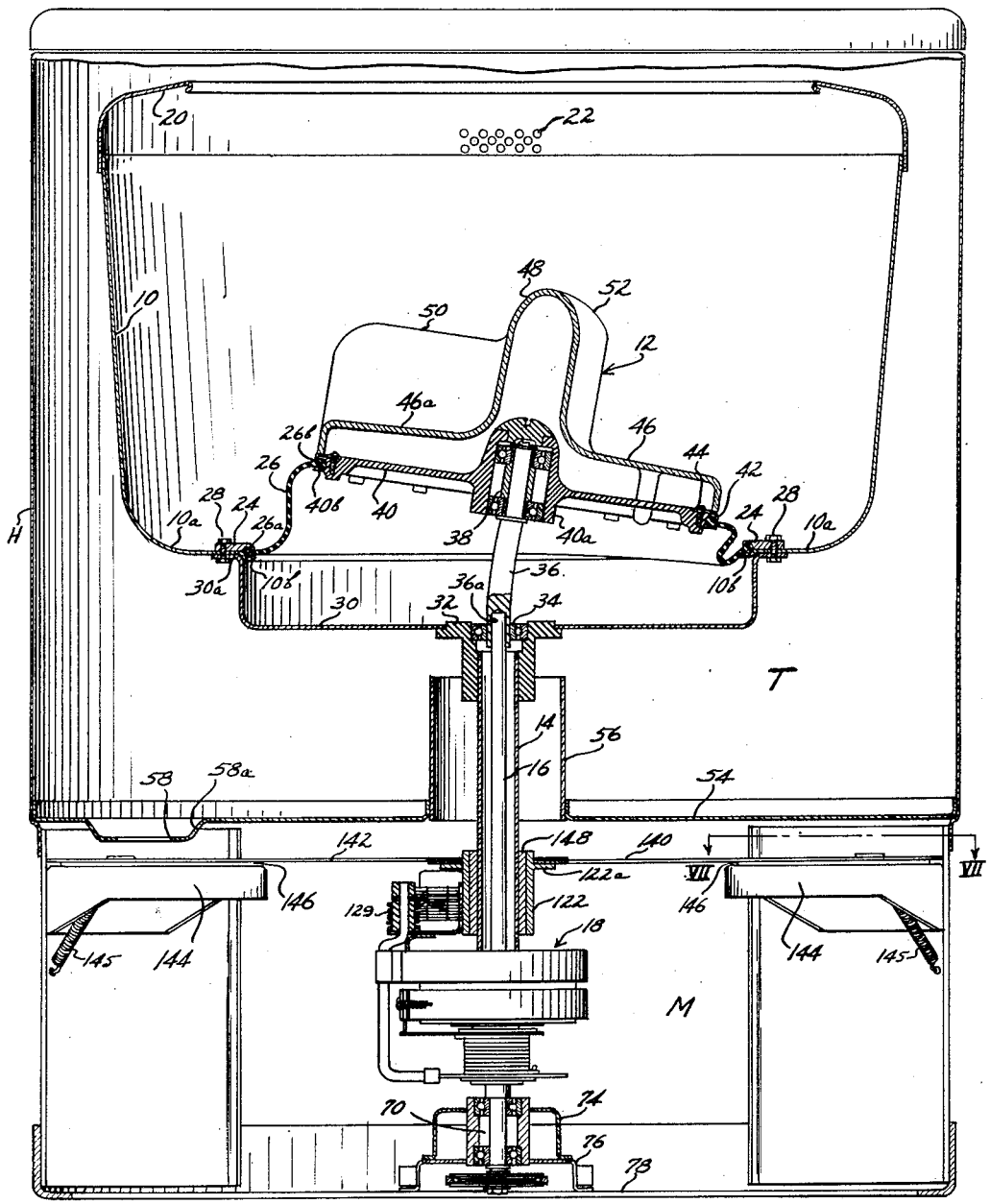

Referring now to Figure 1 there is shown at H a housing defining a clothes laundering tub T and a lower chamber M to contain mechanical drive and support elements. The tub T contains a clothes tub 10 and a wobble plate agitator 12 which are mounted for actuation by shafts 14 and 16, respectively. These shafts are vertically directed and extend downwardly to the drive mechanism shown generally at 18 and which is disposed within the lower chamber M.

The mechanism contained within the tub T is like that described and claimed in the copending application of George C. Fields, entitled "Wobble Plate Laundering Machine," Serial No. 784,135, filed November 5, 1947, now Patent No. 2,502,372, issued March 28, 1950, and assigned to the same assignee as the present invention. Briefly, this mechanism includes a clothes tub 10 of generally cylindrical shape having imperforate sides and enlarging progressively to increased cross-sectional area at the top. A cap 20 is shaped to fit snugly over the top of the tub 10 and is shaped to extend inwardly thereover. This cap is provided with a plurality of openings 22 through which water may pass into the tub T when the tub 10 is rotated at sufficient velocity.

At its bottom portion 10a, the tub 10 extends inwardly and defines a circular opening having a depressed cupped lip portion 10b. A ring 24 having an annular opening is seated above the edge of this opening to define a somewhat toroidal cavity in conjunction with the lip portion 10b of the tub 10. This cavity receives the enlarged peripheral portion 26a of the flexible waterproof boot 26. The ring 24 is held in place against the lower portion 10a of the tub 10 by a plurality of spaced bolts 28 which are shown in elevation in Figure 1.

A cup-shaped member 30 having an outwardly extending flange portion 30a is held on the under side of the bottom 10a of the tub 10 by the bolts 28. This member is supported on the collar 32, being attached thereto by welding or other suitable means. This collar fits snugly over the outer or tub shaft 14 and sustains the tub 10 in position. It further supports the shafts 14 and 16 relative to each other by reason of the bearing 34 which has its outer race mounted on collar 32 and its inner race on the shaft 36 which in turn is mounted on shaft 16.

The shaft 36 is bent as indicated in Figure 1 and is provided with a cylindrical cavity 36a to fit snugly on the end of the shaft 16. At its upper end, shaft 36 mounts the inner race of the ball bearing 38. The outer race of this bearing is mounted in the cylindrical cavity formed in the hub portion 40a of the lower plate 40 of agitator 12.

The lower plate 40 of agitator 12 is of circular shape and at its outer periphery is shaped to form a seat for the enlarged upper peripheral portion 26b of the boot 26, this seat being indicated at 40b. A ring 42 is mounted upon the upper surface of the outer periphery of the plate 40 by a plurality of spaced bolts 44. This ring extends to the periphery of the plate 40 and extends downwardly thereabout to define a somewhat toroidal cavity to receive the enlarged upper peripheral portion 26b of the boot 26.

The upper portion 46 of the agitator 12 is held to the lower plate 40 by suitable attaching bolts (not shown). This portion of agitator 12 is shaped to form a surface 46a substantially parallel to the lower plate 40 and a centrally disposed dome 48 in alignment with the axis of the bent portion of shaft 36. In addition, ribs 50 and 52 are formed by the member 46. The ribs 50 are relatively short and extend a relatively great radial distance from the dome 48 whereas the ribs 52 are relatively high and extend only a short radial distance from the dome 48. Three ribs of each type are provided and they are positioned at equal angular spacings about the dome 48, the ribs being interleaved so that each rib 50 is adjacent to two ribs 52 and vice versa.

The lower portion or bottom of tub T is defined by the horizontally disposed plate 54 which has a centrally disposed opening to receive the tube 56. In addition, the plate 54 is provided with a drain opening 58 disposed in a depressed sump portion 58a. This opening is connected to a drain (not shown) to drain water collecting in the bottom of the tub T.

In the operation of the above-described mechanism, clothes are first placed in the tub 10 and the tub filled with water. The inner shaft 16 is then rotated while the outer shaft 14 is held against rotation. This causes the agitator 12 to tilt about different axes as the shaft 36 rotates, thereby imparting wobbling movements to the entire agitator 12. The agitator does not rotate because the boot 26, together with the clothes and water in the tub, overcome the friction in the bearing 38. These wobbling movements imparted to the agitator 12 cause the clothes in the tub to execute clothes washing movements, and the shaft 16 is rotated for a period of time sufficient to clean the clothes.

When the clothes have been washed, the shaft 14 is rotated with shaft 16. At this time the entire tub 10 rotates and the water therein is driven by centrifugal forces to the outer wall of the tub 10. As the rotational velocity increases the water climbs up the wall since the tub 10 is a tapered tub with progressively increased cross sectional area with increased height. The water eventually reaches the openings 22 where it splashes out and is drained through the opening 58 of the tub T. As further rotation of the tub 10 takes place, the water contained in the clothes is driven out by centrifugal force and is forced out of the tub 10 through the openings 22.

During rinsing and subsequent drying operations, the foregoing cycle is repeated, the tub being filled with water and the shaft 16 rotated to rinse the clothes and the shafts 14 and 16 being simultaneously rotated to free the tub of water and to dry the clothes.

The operation of the foregoing portions of the mechanism is described in detail and claimed in the copending application of George C. Fields entitled "Wobble Plate Laundering Machine," Serial No. 784,135, filed November 5, 1947, and assigned to the same assignee as the present invention.

Figure 2:
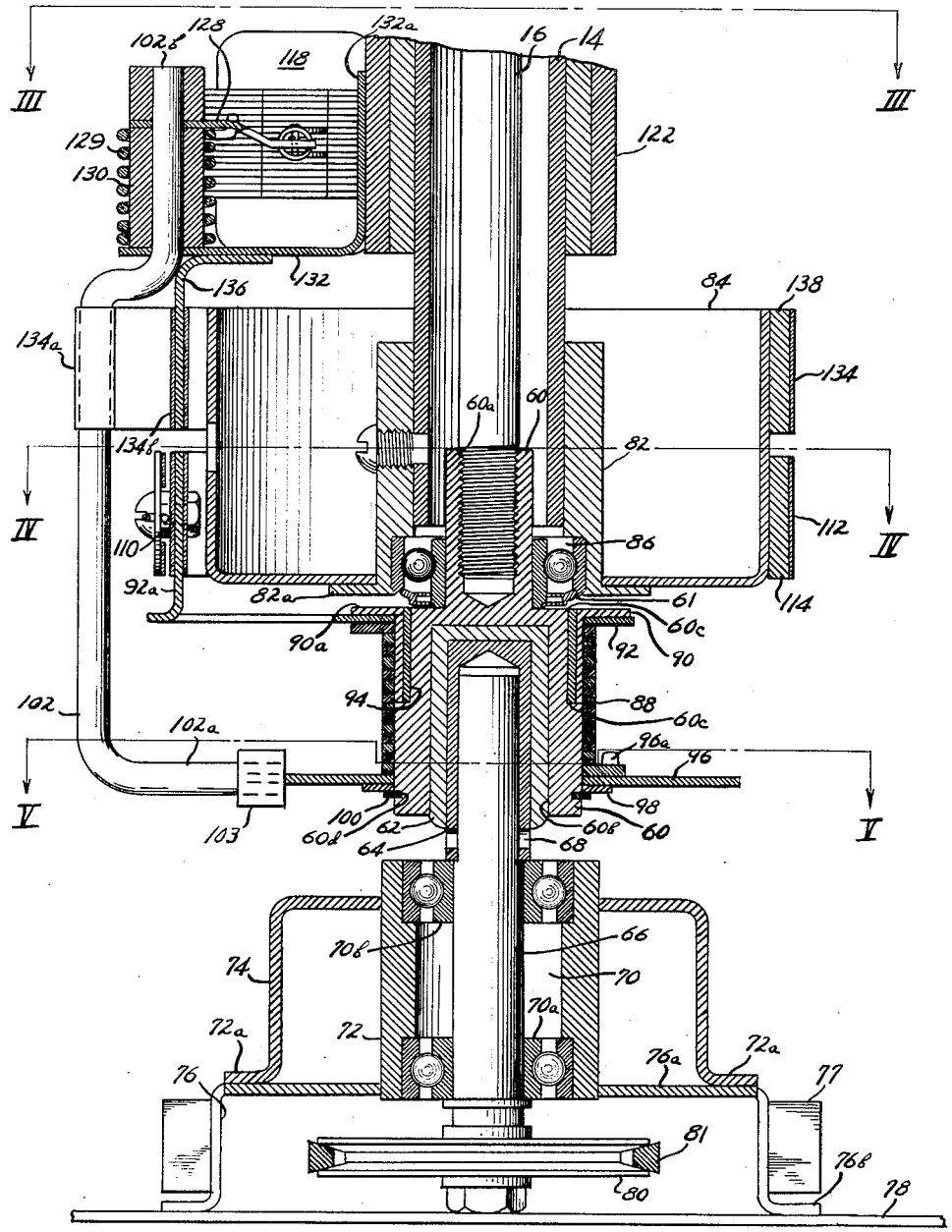
Figure 2 is an enlarged fragmentary axial cross sectional view showing the clutch and brake portion of the present invention.

The mechanism whereby shafts 14 and 16 are selectively driven and shaft 14 is braked is indicated generally at 18, Figure 1. An enlarged cross sectional view of this portion of the mechanism is shown in Figure 2. As shown in the latter view, the shaft 16 seats in an upper cylindrical opening 60a in the collar 60. This collar is of cylindrical shape and has a lower cylindrical opening 60b in its bottom portion. This opening receives the resilient cup-shaped insert 62. Insert 62 receives the cap 64 which is fitted on the lower shaft 66. The cap 64 is held for rotation with the shaft 66 by the pin 68.

The shaft 66 sustains the weight of the tub, agitator, clothes, etc., and is held in position by the bearing 70. This bearing consists of two separate ball bearing portions 70a and 70b, each having its inner race press fitted on the shaft 66 and its outer race fitted on the sleeve 72. The sleeve 72 is held in position by the upstanding dome 74 which has a flange 72a welded or otherwise attached to the upper surface 76a of the dome 76. The surface 76a of lower dome 76 is shaped snugly to receive the lower portion of sleeve 72. The dome 76 is provided with a lower flange 76b which is attached to the lower support plate 78 of the housing H. The dome 76 is attached to the wall of housing H by the ears 77.

A pulley 80 is mounted on the lower portion of the shaft 66 to receive a belt 81 connected to the drive mechanism for the assembly. This drive mechanism may, for example, comprise an electric motor (not shown), connected to automatic switch elements that energize the motor for rotation whenever it is desired to wash, rinse or dry clothes in the tub 10. As will be described in further detail hereinafter, the mechanism of this invention selectively couples the pulley 80 to the tub 10 or agitator 12 to provide selective washing, rinsing, or drying movements.

The operation of the mechanism of the present invention will best be understood by reference to the cross sectional view of Figure 2. As indicated, the outer or tub shaft 14 is terminated at its lower end by the inner collar 82 of the brake and clutch drum 84. The flange portion 82a of this collar is attached to the drum 84 by welding or other suitable method. This collar is press-fitted to the outer race of the ball bearing 86 at its lower end, the inner race of this bearing being supported on collar 60. The collar 60 is of cylindrical shape and is formed to define a shoulder 60c against which the inner race of this bearing rests to support the tub 10 from the collar 60. A grease retaining washer 61 is interposed between the outer and inner races of bearing 86 to hold grease therein.

A sleeve 90 having an outwardly extending flange surrounds the collar 60 in the region immediately below the shoulder 60c and is separated therefrom by the bearing sleeve 94 which permits relative rotation between the sleeve 90 and the collar 60. Sleeves 90 and 94 ride in a section of reduced diameter of collar 60 formed by the shoulder 60c. A coil spring 88 surrounds the lower portions of the collar 60 and extends up to the plate 92 which rests underneath the flange portion 90a of the sleeve 90. At its lower end the spring 88 is supported by the catch plate 96 which is supported from the collar 60 by the washer 98 and the snap ring 100, the latter riding in the peripheral groove 60d of the collar 60.

As is best shown in the cross sectional view of Figure 5, the catch plate 96 is provided with a pair of upstanding portions 96a which receive the radially extending end 88a of the spring 88 to prevent rotation thereof relative to the plate 96.

As shown in the figures, the spring 88 is made of coiled wire having a rectangular cross section to achieve a large area of contact with the outer surface of the collar 60 and the sleeve 90. Moreover, this spring is constructed to assume a condition of diameter smaller than the collar 60 and the sleeve 90 when in the unstressed condition. Thus in the unrestrained condition this spring grips these members and provides a driving engagement from collar 60 to the sleeve 90. The spring 88 is placed on the collar 60 by first unwinding it to an extent sufficient to open it to a diameter greater than that of collar 60 and holding it in the unwound condition while slipping it over that collar. The spring is then released and winds to grip the collar 60 and the sleeve 90.

When the arm 102 is held in the position indicated in the solid lines of Figures 2 and 5, it engages the edge 96b of the plate 96 and the end 88a of the spring 88 is held against rotation. However, when the collar 60 is driven in the counterclockwise direction as indicated by the arrow 104, and the arm 102a is in a dotted position shown in Figure 5, the plate 96 will be free to rotate and frictional engagement of the collar 60 with the spring 88 will cause the latter to unwind and hence to grip and rotatably drive the sleeve 90.

The outer shaft 14 is connected to the plate 92 through the upwardly extending portion 92a of that plate and the drum 84. This portion of the mechanism can best be understood from Figure 4 which is a cross sectional view through the axis IV—IV, Figure 2. As indicated, the arm 92a of the plate 92 extends upwardly and axially relative to shafts 14 and 16 and is provided with an opening through which the screw 106 extends, this screw being held at its opposite end by the nut 106a. Intermediate between the nut 106a and the head of screw 106 is mounted a washer 108, a collar 110, and the wrapped over or looped end portion 112a of the clutch band 112.

The clutch band 112 is provided with a bifurcated end portion 112b which is best seen in the developed plan view of Figure 6. This portion is received about the collar 110 as indicated in Figures 2 and 4 and thereby holds the clutch band 112 about the drum 84. A clutch shoe 114 is interposed between the drum 84 and the band 112 to provide a good frictional engagement and a suitable wearing surface between these parts. A coil spring 113 is hooked at its opposite ends to the washer 108 and the band 112 and acts to hold the band 112 snugly against the drum 84. The frictional engagement between the shoe 114 and the drum 84 is adjusted by varying the tension of this spring.

When the plate 92 is rotated in the counterclockwise direction as indicated by the arrow 116, the band 112 is pulled about drum 84 from its looped end 112a. This band thereby tends to wrap itself about the drum 84 and supplement the action of spring 113.

From the foregoing it will be seen that when the arm 102a is in the position indicated in the solid lines of the figures, the spring 88 is unwrapped and there is no significant driving action between the collar 60 and the shaft 14. On the other hand, if the spring 88 is released to wrap itself about the sleeve 90 and thus cause the plate 92 to rotate, the shaft 14 is driven through the clutch band 112 which rides on the drum 84.

The position of the arm 102a of member 102 is controlled by the solenoid 118 which is shown in elevational view in Figure 2 and top plan view in Figure 3. This solenoid is mounted on the bracket 120 by welding or other suitable methods, which bracket has its arm 120a attached to the sleeve 122 by welding or other suitable means. A plunger 124 of magnetic material is mounted within the solenoid 118 and extends therefrom to receive the spring 126. The latter is held relative to the plunger 124 by the pin 124a which engages the hooked end portion thereof. At its opposite end the spring 126 is received in the opening 128a of the crank arm 128. A coil spring 129 has one end hooked over the edge of the bracket 132 and the opposite end hooked over the crank arm 128, thereby urging the crank 128 against the pull of plunger 124.

The crank arm 128 is received in the sleeve 130 and engages the end 102b of the shaft 102 to rotate that shaft about the axis through the sleeve 130. The sleeve 130 is fixedly supported by the bracket 132 which has its upstanding end portion 132a welded or otherwise held in engagement with the sleeve 122.

From the foregoing it will be evident that when the solenoid 118 is energized to draw the plunger 124 into the position shown in Figure 3, and thus to rotate crank arm 128, the shaft 102b is rotated within the collar 130 and swings the arm 102a to the engaging position relative to the catch plate 96 as indicated in Figure 5. On the other hand, when the solenoid 118 is deenergized and thus exerts no force against plunger 124, the spring 129 unwinds to rotate the crank 130 and swing the arm 102a outwardly. The arm 102a is thereby swung to the position indicated by the dotted lines of Figure 5 and does not engage the disk 96, thus permitting the spring 88 to wind freely and wrap itself about the collar 60.

The arm 102a is provided with a block 103 of rectangular cross-section to provide a positive engagement with the edge 96b of catch plate 96.

In addition to controlling the driving engagement of shaft 14 through the spring 88, energization of solenoid 118 controls the braking of that shaft. This operation is achieved by the brake band 134 which is wrapped around the upper portion of the drum 84 and is held to the shaft 102 at its wrapped looped end portion 134a. The opposite looped over end portion 134b of band 134 is wrapped about the downwardly extending arm 136 which is supported from the bracket 132 by welding or other suitable means. A brake shoe 138 is interposed between the band 134 and the drum 84 to provide a good friction and wearing surface.

When the solenoid 118 is energized to cause plunger 124 to pull crank arm 128 to the position shown at Figure 3, the central portion of the arm 102 is swung in direction to tension the brake band 134 and thus cause braking engagements between that band and the drum 84, thereby opposing rotation of the shaft 14.

On the other hand, when the solenoid 118 is deenergized, the shaft 102 is swung about the axis of sleeve 130 by spring 129 and thereby releases the band 134 to permit the drum 84 to ride free of that band.

The sleeve 122 upon which brackets 120 and 132 are supported, is provided with a flange 122a, Figure 1, upon which are mounted the two crossed supporting and snubbing plates 140 and 142. Each of these extends between opposite support brackets 144 mounted at opposite corners of the housing H. The sleeve 122 is held against the outer shaft 14 by a suitable sleeve bearing 148.

The construction of the supports for the plates 140 and 142 may best be understood by reference to Figures 7 and 8 which show in top plan and side elevation the attachment of one end of the plate 140. As will be evident from these views, a friction plate 146 of suitable brake lining material is interposed between the plate 140 and the bracket 144. A bolt 147 having a washer head portion 147a extends through suitable openings provided in the plate 140, the friction plate 146, and the bracket 144. The coil spring 145 is received at one end in an opening in the bolt 147 and at the opposite end is received in a slot 146 in the leg portion of the housing H and acts to urge member 140 against the friction plate 146.

Since the plates 140 and 142 frictionally oppose lateral vibrations of the shafts 14 and 16, they act as snubbing or damping elements to limit the magnitude of these vibrations.

The resilient insert 62 interposed between the collar 60 and the stub shaft 66 is made of rubber or similar material. This insert acts to isolate the stub shaft 66 from any vibratory movements imparted to the shafts 14 and 16 and thus supplements the action of the snubbing plates 140 and 142 in limiting the vibration imparted to the shaft 66. It further acts to transmit power to and allow rotation of the shafts 14 and 16 even though collar 60 is misaligned with stub shaft 66 due to unbalanced loads in the tub.

The friction or clutch drive by which the shaft 14 is rotated from the shaft 66 when the solenoid 118 is energized permits the tub 10 to be brought up to speed even though it contains water and even though the drive mechanism attached to pulley 80 is of limited torque capacity. This results from the fact that if predetermined torque is exceeded the clutch formed between the drum 84 and the band 112 slips to limit the torque exerted on the pulley 80. However, this limited torque is effective to accelerate the tub 10 and to drive the water out the openings 22. Finally when the tub 10 approaches the speed of the shaft 66, the clutch slip progressively decreases until when these two speeds are equal a direct drive is obtained.

The insert 62 interposed between the collar 60 and the shaft 68 acts as a vibration isolating device to isolate the periodic or vibratory forces associated with an unbalanced load in the tub 10 from the pulley 80 and the support structure of the housing H.

During the time the clutch formed by drum 84 and band 112 is slipping, the shaft 16 rotates relative to shaft 14. However, this does no harm since this relative rotation merely causes the agitator 12 to execute wobbling movements.

In the accompanying claims I have used the term "cylinder" to indicate a part having a cylindrical surface such as, for example, the sleeve 90 and the collar 60, Figure 2.

While I have shown a particular embodiment of my invention, it will, of course, be understood that I do not wish to be limited thereto since many modifications both in the elements employed and their cooperative structure may be made without departing from the spirit and scope thereof. I, of course, contemplate by the appended claims to cover any such modifications as fall within the true spirit and scope of my invention.

I claim as my invention:

1. In a drive mechanism in combination, a drum to be rotated or braked, a pair of adjacent cylinders of like diameter mounted coaxially with said drum, means to rotate one of said cylinders in predetermined direction, a coil spring tending in the unstressed condition to assume a configuration of smaller diameter than said cylinders and mounted to encircle said cylinders, whereby one end of said spring may be held against rotation to unwind said spring and release the driving engagement between said cylinders, a member having an arm extending in the axial direction relative to said drum and mounted for rotation with the other of said cylinders, a clutch band wrapped about said drum and attached at one end to said arm to cause said band to tighten about said drum when said arm is rotated in said predetermined direction, a brake selectively engageable with said drum, and elements simultaneously to engage said brake and engage said end of said spring, whereby said spring is unwound and said cylinders are released when said brake is engaged and said spring is released and said drum is driven when said brake is released.

2. In combination in a drive mechanism, for a drum to be selectively rotated or braked, a pair of adjacent cylinders of like diameter mounted coaxially with said drum, means to rotate one of said cylinders in predetermined direction, a coil spring tending in the unstressed condition to assume a configuration of smaller diameter than said cylinders and mounted to encircle said cylinders, whereby one end of said spring may be held against rotation to unwind said spring and release the driving engagement between said cylinders, a member having an arm extending in the axial direction relative to said drum and mounted for rotation with the other of said cylinders, and a clutch band wrapped about said drum and attached at one end to said arm to cause said band to tighten about said drum when said arm is rotated in said predetermined direction, whereby said drum is driven when said end of said spring is released to permit said spring to tighten about said cylinders and said drum is released when said end of said spring is held against rotation to unwrap said spring.

3. In combination in a drive mechanism, a drum to be selectively rotated or braked, a pair of adjacent cylinders of like diameter mounted coaxially with said drum, means to rotate one of said cylinders in predetermined direction, a coil spring tending in the unstressed condition to assume a configuration of smaller diameter than said cylinders and mounted to encircle said cylinders, whereby one end of said spring may be held against rotation to unwind said spring and release the driving engagement between said cylinders, a member having an arm extending in the axial direction relative to said drum and mounted for rotation with the other of said cylinders, a clutch band wrapped about said drum and attached at one end to said arm to cause said band to tighten about said drum when said arm is rotated in said predetermined direction, a brake band mounted about said drum, a support arm attached to one end of said brake band, and a crank arm extending in an axial direction relative to said drum and attached to the other end of said brake band selectively to tighten said brake band, said crank arm extending axially of said drum to engage the other end of said spring when rotated to tighten said brake band, whereby said spring is unwound and said cylinders are released when said crank arm is rotated to tighten said brake band and said spring is released and said drum is driven when said crank arm is rotated to release said brake band.

4. In a selective drive mechanism, a pair of concentric driven shafts including an inner shaft and an outer shaft, said mechanism including a drum mounted on said outer shaft, a collar secured to said inner shaft, a sleeve mounted concentrically with said collar and adjacent thereto, means to rotate said collar and inner shaft, a coil spring tending in the unstressed condition to assume a configuration of smaller diameter than said collar and mounted to encircle said collar and said sleeve, means holding one end of said spring against rotation to unwind said spring and release the driving engagement between said sleeve and collar, a member having an arm extending in a radial direction relative to said drum and mounted for rotation with said collar, a clutch band wrapped about said drum and attached at one end to said arm to cause said band to tighten about said drum when said arm is rotated in said predetermined direction, whereby said outer shaft is selectively driven or released when said end of said spring is released to permit said spring to tighten about said collar and said sleeve, and said drum is released when said end of said spring is held against rotation to unwrap said spring.

5. In a selective drive mechanism, a pair of concentric shafts including an inner shaft and an outer shaft, said mechanism including a drum mounted on said outer shaft, a collar secured to said inner shaft, a sleeve concentric therewith, means to rotate said collar and inner shaft, a coil spring tending in the unstressed condition to assume a configuration of smaller diameter than said collar and mounted to encircle said collar and sleeve, means holding one end of said spring against rotation to unwind said spring and release the driving engagement between said collar and sleeve, including a member having an arm extending in a radial direction relative to said drum and mounted for rotation with said sleeve, a clutch band wrapped about said drum and attached at one end to said arm to cause said band to tighten about said drum when said arm is rotated in said predetermined direction, a brake band mounted about said drum, a support arm attached to one end of said brake band, a crank arm extending in an axial direction relative to said drum and attached to the other end of said brake band selectively to tighten said brake band, said crank arm extending axially of said drum to engage the other end of said spring when said crank arm is rotated to tighten said brake band, whereby said spring is wound and said sleeve is released when said crank arm is rotated to tighten said brake band and said spring is released and said drum is driven when said crank arm is rotated to release said brake band.

6. In a laundering machine of the type having a clothes tub mounted on an outer vertical shaft for rotation therewith and having an agitator disposed in said tub for movements therein and supported on an inner vertical shaft disposed coaxially with said first shaft, a mechanism comprising elements to support said inner shaft and operable to rotate said shaft, a bearing mounted to sustain said outer shaft from said inner shaft, and control mechanism selectively operable to drive said outer shaft from said inner shaft or to brake said outer shaft, said mechanism including a clutch interposed between said inner shaft and said outer shaft to limit the torque exerted on said elements.

7. In a laundering machine of the type having a clothes tub mounted on an outer shaft for rotation therewith and having an agitator disposed in said tub for movements therein and supported on an inner shaft disposed coaxially with said first shaft, a mechanism comprising a collar on the lower end of said inner shaft and extending below the end of said outer shaft, means to rotate said collar in predetermined direction, said collar having a portion of cylindrical shape, a sleeve of diameter substantially equal to the diameter of said collar mounted for rotation relative to said collar and in abutting relation with said portion thereof, an arm mounted for rotation with said sleeve and extending axially of said shafts, a coil spring tending in the unstressed condition to assume a configuration of smaller diameter than said sleeve and mounted to encircle said portion of said collar and said sleeve, whereby one end of said spring may be held against rotation to unwind said spring and release the driving engagement between said collar and said sleeve, a drum mounted on said outer shaft, a clutch band wrapped about said drum and attached at one end to said arm to cause said band to tighten about said drum when said arm is rotated in said predetermined direction, whereby said outer shaft is driven when said end of said spring is released to permit said spring to tighten about said collar and said outer shaft is released when said end of said spring is held against rotation to unwrap said spring.

8. In a laundering machine of the type having a clothes tub mounted on an outer shaft for rotation therewith and having an agitator disposed in said tub for movements therein and supported on an inner shaft disposed coaxially with said first shaft, a mechanism comprising a collar on the lower end of said inner shaft and extending below the end of said outer shaft, means to rotate said collar in predetermined direction, said collar having a portion of cylindrical shape, a sleeve of diameter substantially equal to the diameter of said collar mounted for rotation relative to said collar and in abutting relation with said portion thereof, an arm mounted for rotation with said sleeve and extending axially of said shafts, a coil spring tending in the unstressed condition to assume a configuration of smaller diameter than said sleeve and mounted to encircle said portion of said collar and said sleeve, whereby one end of said spring may be held against rotation to unwind said spring and release the driving engagement between said collar and said sleeve, a drum mounted on said outer shaft, a clutch band wrapped about said drum and attached at one end to said arm to cause said band to tighten about said drum when said arm is rotated in said predetermined direction, a brake band mounted about said drum, a support arm attached to one end of said brake band, a crank arm extending in an axial direction relative to said drum and attached to the other end of said brake band selectively to tighten said brake band, said crank arm extending axially of said drum to engage the other end of said spring when said crank arm is rotated to tighten said brake band, whereby said spring is unwound and said outer shaft is released when said crank arm is rotated to tighten said brake band and said spring is released and said outer shaft is driven when said crank arm is rotated to release said brake band.

9. In a laundering machine of the type having a clothes tub mounted on an outer shaft for rotation therewith and having an agitator disposed in said tub for movements therein and supported on an inner shaft disposed coaxially with said first shaft, a mechanism comprising a collar on the lower end of said inner shaft and extending below the end of said outer shaft, means to rotate said collar in predetermined direction, said collar having a portion of cylindrical shape, a sleeve of diameter substantially equal to the diameter of said collar mounted for rotation relative to said collar and in abutting relation with said portion thereof, an arm mounted for rotation with said sleeve and extending axially of said shafts, a coil spring tending in the unstressed condition to assume a configuration of smaller diameter than said sleeve and mounted to encircle said portion of said collar and said sleeve, whereby one end of said spring may be held against rotation to unwind said spring and release the driving engagement between said collar and said sleeve, a catch plate mounted for rotation with said one end of said spring and having an abutment facing forwardly when rotated in said direction, a drum mounted on said outer shaft, a clutch band wrapped about said drum and attached at one end to said arm to cause said band to tighten about said drum when said arm is rotated in said predetermined direction, a brake band mounted about said drum, a support arm attached to one end of said brake band, a crank arm extending in an axial direction relative to said drum and attached to the other end of said brake band selectively to tighten said brake band, said crank arm having a section extending radially of the axis of said shafts and operable to be engaged by said catch plate, and means selectively operable to rotate said crank arm in direction to tighten said brake band or to release said crank arm.

10. In a laundering machine of the type having a clothes tub mounted on an outer vertical shaft for rotation therewith and having an agitator disposed in said tub for movements therein and supported on an inner vertical shaft disposed coaxially with said first shaft, a mechanism comprising a stub shaft mounted coaxially with said shafts, means to rotate said stub shaft, a member of resilient material seated on said stub shaft and said inner shaft to isolate said stud shaft from vibrations imparted to said inner shaft, elements to sustain said outer shaft from said inner shaft, and a control mechanism selectively operable to drive said outer shaft from said inner shaft or release said outer shaft.

11. In a laundering machine of the type having a clothes tub mounted on an outer vertical shaft for rotation therewith and having an agitator disposed in said tub for movements therein and supported on an inner vertical shaft disposed coaxially with said first shaft, a mechanism comprising a stub shaft mounted coaxially with said shafts, means to rotate said stud shaft in predetermined direction, a collar mounted on the end of said inner shaft, a cup shaped member of resilient material seated on said stud shaft and said collar to isolate said stub shaft from vibrations imparted to said inner shaft, a sleeve of substantially the diameter of said collar and rotatably supported in abutting relation thereto, clutch elements interposed between said sleeve and said outer shaft, a coil spring tending in the unstressed condition to assume a configuration of smaller diameter than said sleeve and mounted to encircle said collar and said sleeve, whereby one end of said spring may be held against rotation to unwind said spring and release the driving engagement between said collar and said sleeve, and elements selectively operable to engage or release said end of said spring to drive or release said outer shaft.

12. In a laundering machine of the type having a clothes tub mounted on an outer vertical shaft for rotation therewith and having an agitator disposed in said tub for movements therein and supported on an inner vertical shaft disposed coaxially with said first shaft, a mechanism including a drum mounted on said first shaft, a brake band wound about said drum and selectively operable frictionally to oppose rotations thereof, a clutch band wound about said drum and selectively operable frictionally to drive said first shaft, and elements operable in one condition to engage said brake band to oppose rotations of said drum and in another condition to engage said clutch band to drive said drum.

DAVID A. JOHNSON.

REFERENCES CITED

The following references are of record in the file of this patent:

UNITED STATES PATENTS

| Number | Name | Date |
| --- | --- | --- |
| 1,629,098 | Drexler | May 17, 1927 |
| 1,699,838 | Georg | June 22, 1929 |
| 2,384,903 | Ferris | Sept. 18, 1945 |
| 2,510,653 | Pepper | June 6, 1950 |